United States Patent [19]

Crass et al.

[11] Patent Number: 5,288,437
[45] Date of Patent: Feb. 22, 1994

[54] PROCESS TO PRODUCE THIN FILM

[75] Inventors: Guenther Crass, Taunusstein; Siegfried Janocha, Wiesbaden; Gisbert Bammert, Eltville-Rauenthal, all of Fed. Rep. of Germany

[73] Assignee: Hoechst Aktiengesellschaft, Fed. Rep. of Germany

[21] Appl. No.: 878,258

[22] Filed: May 4, 1992

[30] Foreign Application Priority Data

May 6, 1991 [DE] Fed. Rep. of Germany ....... 4114670

[51] Int. Cl.$^5$ .............................................. B29C 55/12
[52] U.S. Cl. ................................. 264/25; 156/244.11; 264/166; 264/178 R; 264/210.2; 264/171; 264/290.2
[58] Field of Search ..................... 264/171, 290.2, 166, 264/346, 210.2, DIG. 73, 178 R, 25; 156/244.11

[56] References Cited

U.S. PATENT DOCUMENTS

| 3,322,870 | 5/1967 | Sacks | 264/514 |
|---|---|---|---|
| 3,632,733 | 1/1972 | Yazawa | 264/346 |
| 3,734,994 | 5/1973 | Blecha | 264/DIG. 73 |
| 4,076,785 | 3/1978 | Schmidt | 264/290.2 |
| 4,230,658 | 10/1980 | Matsukura et al. | 264/290.2 |
| 4,767,488 | 8/1988 | Rasmussen | 264/290.2 |
| 4,871,506 | 10/1989 | Moulies et al. | 264/166 |

FOREIGN PATENT DOCUMENTS

| 887168 | 11/1971 | Canada . | |
|---|---|---|---|
| 53-11996 | 4/1978 | Japan | 264/290.2 |
| 53-115784 | 10/1978 | Japan | 264/290.2 |
| 61-31236 | 2/1986 | Japan | 264/290.2 |

*Primary Examiner*—Jeffery Thurlow
*Attorney, Agent, or Firm*—Gregory N. Clements

[57] ABSTRACT

A process is described to produce ultra thin biaxially stretched film made of thermoplastic where at least two film webs are superimposed and stretched together in both the longitudinal and transverse directions. The film webs are subjected to a heat treatment before the first draw step. After stretching, the film webs are separated again from each other.

10 Claims, No Drawings

PROCESS TO PRODUCE THIN FILM

BACKGROUND OF THE INVENTION

1) Field of the Invention

The present invention relates to a process for producing biaxially stretched film made of thermoplastics, with a thickness of less than 2 μm, where at least two films are superimposed and stretched together in the longitudinal and transverse directions.

2) Prior Art

Ultra thin films with a thickness less than 3 μm, particularly less than 1 μm are required on ever larger scales for the production of capacitors in microelectronics. In practice, the production of these films presents extraordinary difficulties. In literature, different processes are described aiming mainly to produce first the thin film together with or on a base film, peel off the base film, and then roll up the thin film.

German Auslegeschrift DE-A-17 04 764 (equivalent to Canadian Patent 887,168) describes how two single films can be caused to adhere to one another through pressure and/or heat. Due to unavoidable slight variations in thickness of the single films, creases are formed repeatedly, whereby the creases are further ingrained during the laminating process, which means that such films are useless for their intended purpose.

German Auslegeschrift DE-A-24 31 385 (equivalent to U.S. Pat. Nos. 4,017,227 and 4,076,785) describes a device where two cast sheets are produced next to each other and joined before stretching in the transverse direction. In this method, however, the supporting function of the base layer is missing and breaking of the thin film is frequently observed.

European Patent Application EP-A-0 153 081 (equivalent to U.S. Pat. Nos. 4,708,905 and 4,756,064) relates to stretching coextruded composite films, where the individual layers are made of different polymers, and to delaminating the film composite, after stretching. But with this process, the flow velocity of the different plastics cannot be coordinated exactly. Regulating a uniform thickness profile across the film width also creates great problems since allocating the thickness distribution of the total composite film and the top layer is difficult; moreover, adjustment of the thickness profiles of the individual layers is subject to constant fluctuations at coextrusion.

It is also known that at the time the melt is drawn from the extruder, the molten plastic already has a certain measurable molecular preorientation which is dependent upon technical conditions, like die position, die width, take-off speed, chemical composition of the plastic, and its degree of polymerization. The level of the molecular preorientation and its uniformity, are of considerable importance for the further stretching and for the physical properties of the final film, such as mechanical properties like tear resistance and dimensional stability or the thickness profile and is of particularly crucial importance when producing extremely thin films.

SUMMARY OF THE INVENTION

The purpose of the present invention was to devise a process which makes it possible to produce thin films with a thickness of 2 μm and less, with carefully directed control of the molecular preorientation, with optimized reliability, and improved thickness uniformity.

In the broadest sense, the present invention relates to a process for producing ultra thin films of 2 μm (microns) or less. The films are either manufactured or produced separately and then superimposed together or are coextruded, and subject to a heat treatment process. Thereafter, the heat treated superimposed films are stretched biaxially thereby forming ultra thin films of 2 μm or less.

DESCRIPTION OF THE PREFERRED EMBODIMENTS

Production of thin films of a thickness of 2 μm or less was accomplished through the process similar to that mentioned above, wherein prior to the first stretching step in the longitudinal or transverse direction, the superimposed films are subjected to a novel heat treatment before the first draw step. The heat treatment of the present invention is done preferably at a temperature above the glass transition temperature of the plastic which is earmarked for the film having a thickness of 2 μm and smaller. The heat treatment can be done with a water bath, hot air, or heat radiator. The time period for the heat treatment is 60 sec. or less, preferably less than 30 sec.

After the heat treatment, the superimposed films are subjected to biaxial stretching in the longitudinal and transverse directions, whereby it is preferred in the present invention that the area stretching ratio is at least 16, preferably 20 or even more. In particular, the longitudinal stretch immediately follows the heat treatment without any additional intermediate steps, whereby for a polyester film, for example, the longitudinal stretch ratio is to be larger than the transverse stretch ratio. The subsequent transverse stretching is followed by heat setting and subsequent to that the films are separated from each other.

For polyester, the temperature of the heat treatment, which is done preferably with a water bath, is in the range of 50° C. to 90° C., especially preferably between 70° C. and 80° C., depending on the glass transition temperature of the thermoplastic film.

Within the scope of the present invention, suitable thermoplastics especially include synthetic polymers like polyolefins, polyesters, polyamides, polysulphones like polyarylethersulphone, polyaryletherketones, polyphenylene sulfide or polystyrene. Most suitable for this invention are polyolefins and polyesters.

Isotactic polypropylene or copolymers with propylene units and other alpha-olefins with 2 to 6 carbon atoms are suitable polyolefins, as well as mixtures of these. Most suitable polyolefins are isotactic polypropylenes with a n-heptane soluble portion of not more than 10%, such as for example copolymers made of propylene and ethylene with an ethylene portion of 2 to 10% by weight, or copolymers made of propylene and butylene, or 4-methylpentene with a propylene portion of at least 60% by weight.

Within the scope of this invention, the term 'polyesters' includes homo- and copolycondensates, blends of different polyesters, as well as blends of polyesters with other polymers. Examples of suitable polyesters are polycondensates made by reacting terephthalic acid, isophthalic acid or 2,6-naphthalene dicarboxylic acid with glycols having 2 to 10 carbon atoms, yielding polyesters like polyethylene terephthalate, polybutylene terephthalate, poly-1,4-cyclohexylene-dimethylene terephthalate, polyethylene-2,6-naphthalene dicarboxylate or polyethylene-p-hydroxy-benzoate.

The polyesters can be composed of up to 30 mol % of comonomer units whereby a variation in the glycol and/or the acid component is possible. The copolyesters can contain acid components such as adipic acid, glutaric acid, succinic acid, sebacic acid, phthalic acid, isophthalic acid, 5-Na-sulpho isophthalic acid or polyfunctional acids like trimellitic acid and the like.

The polyester mixtures can be made of polyester-homopolymers, polyester-copolymers or polyester-homo and copolymers. Examples are blends of polyethylene terephthalate/polybutylene terephthalate, polyethylene terephthalate/polyethylene isophthalate or polyethylene isophthalate/5-sodium sulphoisophthalate.

Examples of polymers contained in the polyester are polyolefin homo - or copolymers like polyethylene, polypropylene, poly-4-methylpentene, ethylene-vinylacetate-copolymers, which can be saponified, ionomers, polyamides, polyacetones, polycarbonates, polytetrafluoroethylenes, polysulphones and others.

In a preferred embodiment of the present process, the base layer is made of polyolefin and the thin top layer is made of polyester or polyphenylene sulfide.

Joining of the films can be done by the customary laminating process, whereby separately manufactured single films are combined to a multi-ply film by pressure and/or heat. In the present invention, the use of an adhesive between the films is avoided so that the risk of breaking is kept low at the final delamination. The coextrusion process can also be employed where the melts of the individual plastics are combined before or in the die head of the extruder, and then extruded together through the die head. It is preferred in the present invention that the adhesive forces between the film webs, especially the ultra thin polyester coating layer and the polyolefinic base layer, are smaller than or equal to 0.5 N/15 mm so that the film webs can be separated flawlessly from each other.

The invention is explained further by the following non-limiting examples.

COMPARISON EXAMPLE 1

A 30 μm thick polyester film made of polyethylene terephthalate (PET) was stretched simultaneously in a Brückner-Karo-Frame at a stretch temperature of 95° C. and a heating period 1 min., without heat pretreatment, with the largest possible area stretch ratio $\lambda_A = 12.2$ ($\lambda_L = 3.5$, $\lambda_T = 3.5$ .

EXAMPLE 1

The same PET-film as in Comparison Example 1 was heat pretreated in a water bath at 80° C. and a residence time of 60 sec. To maintain the dimensional stability (to avoid shrinkage) the PET-film was kept under tension. After the heat treatment, the film was stretched simultaneously in the same way as the non-treated film.

As a result of the heat treatment the area stretch ratio could be increased by 20% to $\lambda_A = 15$ which led to a considerable decrease in film thickness.

COMPARISON EXAMPLE 2

A 30 μm thick PET-film was stretched in both the longitudinal and transverse directions in a Brückner-Karo-Frame at stretch temperatures of 105° C. and a heating time of 1 min. Under these conditions, maximum area stretch ratios of $\lambda_A = 21.6$ ($\lambda_L = 4.5$, $\lambda_T = 4.8$) were obtained.

EXAMPLE 2.1

The same PET-film as employed in Comparison Example 2 was pretreated (before the actual stretching) in a water bath at a temperature of 80° C. and a residence time of 60 sec. As a result of the heat treatment of the PET-film the area stretch ratio could be increased by 40% to $\lambda_A = 30.8$ and the film thickness could be reduced accordingly.

This confirms the advantage of voiding the molecular preorientation to improve (increase) the stretchability when manufacturing ultra thin polyester films by support techniques (coextrusion and lamination).

EXAMPLE 2.2

A 30 μm thick PET-film was directed over a pair of rolls at a speed of 0.23 m/min through a water bath at 70° C. (residence time 60 sec). Subsequently the film was stretched off-line in a Brückner-Karo-Frame in both the longitudinal and transverse directions. With this pretreatment, the area stretch ratio could be increased by 15% to $\lambda_A = 25$ compared to an untreated PET-film.

COMPARISON EXAMPLE 3

It is known that the test parameters established in the Brückner-Karo-Frame are transferable to continuously working stretch units.

A base film made of LLDPE (linear low density polyethylene), having a thickness of about 100 μm, was laminated with a PET-film having a thickness of about 30 μm, before the longitudinal stretch. After bringing the films together, they were combined to a laminate composite in a longitudinal stretch unit through heat (longitudinal stretch temperatures 110° C. to 115° C.) and subsequently biaxially stretched together.

At an area stretch ratio of $\lambda_A = 16.8$ ($\lambda_L = 4.0$, $\lambda_T = 4.2$) thin polyester films could be manufactured in a thickness range of 1.5 μm. The thin polyester film can easily be separated from the base film. The lamination strength (delamination strength) is below 0.3 N/15 mm.

EXAMPLE 3

The same films as in Comparison Example 3 or at least the polyester film are guided, before the stretching step, over a pair of rolls through a water bath of 80° C. (residence time 60 sec). As a result of the pretreatment the area stretch ratio can be increased by 40% to $\lambda_A = 23.5$ in the subsequent stretching of the films and the film thickness of the polyester layer can be reduced from 1.5 μm to 1.2 μm at the same time. The reliability and stretchability of the films leave nothing to be desired.

COMPARISON EXAMPLE 4

An A/B/A multi-ply film with polyester top layers (A-layers) was produced by coextrusion techniques whereby unmodified Tafmer ® XR 107 LN, a polyester blend made of $C_3C_4$-and $C_2C_3C_4$ building blocks was used as the base layer (B-layer). The thickness of the base layer B was 150 μm, and the polyester top layers A in each case were about 15 μm thick. For an area stretch ratio of $\lambda_A = 17$, thin polyester top layers could be produced in the thickness range of 0.6 μm. The ultra thin polyester top layers could be separated (delaminated) effortlessly from the base layer. Measurements of the composite strength (delamination resistance) yielded values from 0.32 to 0.47 N/15 mm. Analyses of the physical properties of these polyester layers show that the polyester films manufactured by support techniques exhibit properties which correspond essentially to properties of a PET-capacitor film manufactured by conventional process (self-supporting).

EXAMPLE 4

The A/B/A multi-ply film of Comparison Example 4 was pretreated by directing the film, before stretching, through a water bath at 80° C. (residence time 60 sec). As a result of the pretreatment, the area stretch ratio of the film could be increased by 20% to $\lambda_A = 20.5$. This resulted in ultra thin polyester top layers with a thickness from 0.4 µm to 0.5 µm with excellent uniform thickness.

Comparison of the results of the Examples and Comparison Examples (Table) shows clearly the superiority of the process of the present invention.

TABLE

|  | conventional process (free support) | support techniques | process of present invention |
| --- | --- | --- | --- |
| reliability of process* | − | + | + |
| thickness uniformity* | − | +− | + |
| increase in area stretch ratio* | − | +− | + |
| thickness reduction* | − | +− | + |
| delaminability* | ./. | + | + |

*in each case related to the ultra thin film
+ = good
+− = satisfactory
− = poor
./. = not applicable

We claim:

1. A process for producing biaxially oriented thermoplastic films comprising;
   A) superimposing together unoriented thermoplastic films;
   B) heat treating the superimposed films at a temperature in the range of from about 50° C. to 90° C. to improve the stretchability of the films;
   C) heating the heat treated superimposed films immediately following said heat treating step B) and in the absence of intermediate steps to a temperature sufficient for stretching, and
   D) biaxially stretching the superimposed films to a thickness of about 2 µm or less wherein the films are biaxially oriented.

2. The process, as set forth in claim 1, wherein said heat treating step is carried out at a temperature above the glass transition temperature of said thermoplastic films.

3. The process, as set forth in claim 1, wherein said heat treating is done by water bath, hot air, or heat radiator over a time period of less than or equal to 60 sec.

4. The process, as set forth in claim 1, wherein said stretching of said film webs occurs in both the longitudinal and transverse directions whereby the area stretch ratio is larger than or equal to 16.

5. The process as set forth in claim 1, wherein said heat treating step B) is done by water bath.

6. The process, as set forth in claim 1, wherein said films are synthetic polymers selected from among the group consisting of polyolefins, polystyrene, polyesters, polyamides, and polysulphones selected from among the group consisting of polyarylethersulphone, polyaryletherketone, and polyphenylene sulfide.

7. The process, as set forth in claim 1, wherein said superimposing is accomplished by lamination, wherein single films are combined under pressure and/or heat to form a multi-ply composite.

8. The process, as set forth in claim 1 wherein said superimposing is accomplished by coextrusion whereby film webs are extruded together through a die head.

9. The process, as set forth in claim 1, wherein said superimposing is done in such a way that the adhesive forces between said film webs are smaller than or equal to 0.5 N/15 mm.

10. The process of claim 1, further including the step of:
   delaminating said biaxially oriented films from one another.

* * * * *